United States Patent [19]
Hasha

[11] 3,795,138
[45] Mar. 5, 1974

[54] METHOD OF STAGE INTERNAL PRESSURE TESTING CONNECTIONS BETWEEN TUBULAR MEMBERS

[76] Inventor: Malvern M. Hasha, 111 Acacia St., Lafayette, La. 70501

[22] Filed: Mar. 25, 1971

[21] Appl. No.: 127,953

[52] U.S. Cl. .................................. 73/46, 73/49.1
[51] Int. Cl. ............................................. G01m 3/28
[58] Field of Search ..... 73/40.5 R, 40, 37, 46, 49.1; 138/90; 285/333, 334

[56] References Cited
UNITED STATES PATENTS

| | | | |
|---|---|---|---|
| 1,932,427 | 10/1933 | Stone | 285/334 |
| 2,663,183 | 12/1953 | Huhn | 73/46 |
| 3,196,666 | 7/1965 | Conover | 73/40.5 R |

*Primary Examiner*—Richard C. Queisser
*Assistant Examiner*—Joseph W. Roskos

[57] ABSTRACT

Connections between tubular bodies or members are tested by making the connection up to a desired or predetermined amount, the connection is sealed off by positioning seal means internally of the tubular members, and a suitable fluid medium is positioned between the seal means at an initial pressure substantially below the pressure which the connection will encounter during use, and any decay or falloff in pressure from this amount is noted or measured as an indication of a leak or other malfunction in the connection.

In another embodiment, after the connection has been only partially made up a predetermined amount until a primary or initial seal is established in the connection, internal pressure then is initially applied in an amount less than that at which movement of the connection and tubular members occurs (generally, this pressure is substantially below the pressure which the connection will encounter during use), and any falloff or decay in pressure from this amount is determined as an indication of a leak or malfunction in the connection. If the connection does not leak at this pressure, it is increased in sequential amounts or increments to at least or greater than the pressure to which the connection will be subjected in use.

In another embodiment, the connection is made up to the recommended full makeup torque; the connection is sealed off internal of the tubular member; and internally pressure is applied in sequential increments as above described to test the connection.

In another embodiment, the connection may be backed off from its fully made up position, but retained in a relationship which should establish the primary or initial seal therein, and while in this partially made up position, the connection is again subjected to internal pressure testing in sequential increments as above described.

The above tests may be conducted while the connection is not in tension; they may be conducted with the connection in tension; or they may be conducted when the connection is out of tension and then placed in tension.

13 Claims, 9 Drawing Figures

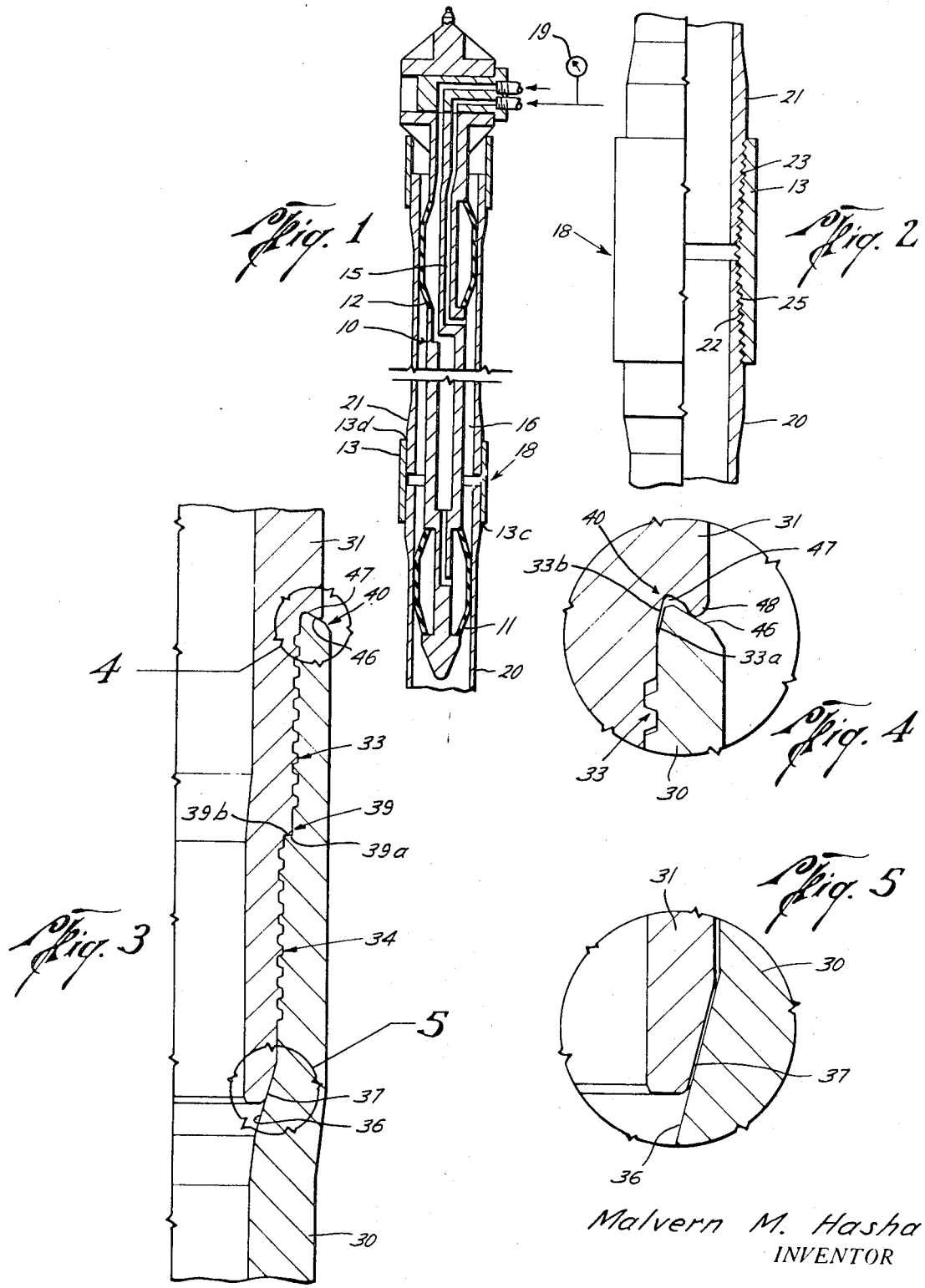

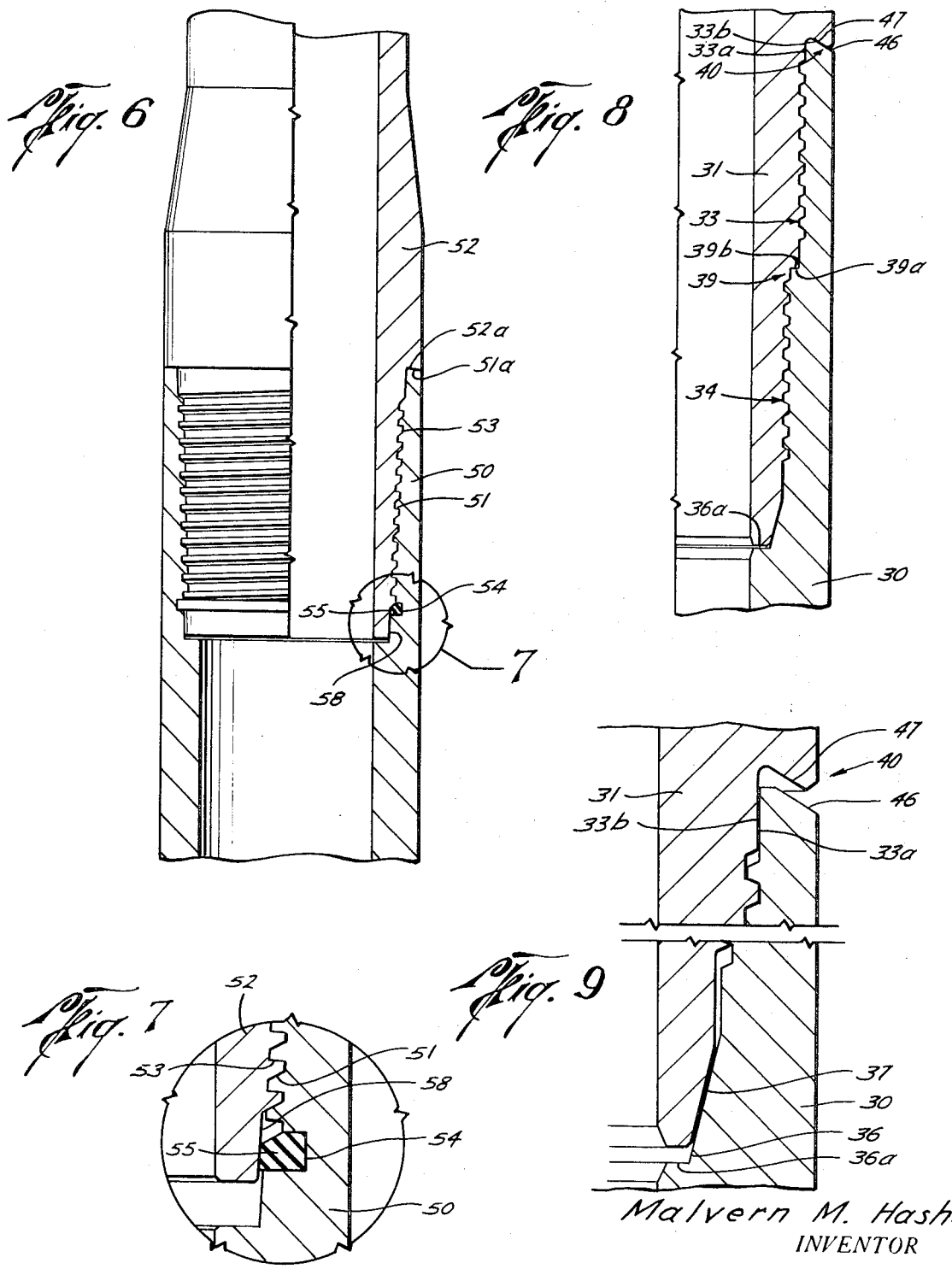

METHOD OF STAGE INTERNAL PRESSURE TESTING CONNECTIONS BETWEEN TUBULAR MEMBERS

CROSS REFERENCE TO RELATED APPLICATION

The present invention relates to a method of externally testing connections between tubular members, and my copending application Ser. No. 127,949 filed Mar. 25, 1971 for "Method of Externally Testing Connections Between Tubular members" relates to an external test protection method.

BACKGROUND OF THE INVENTION

1. Field of the invention

The field of the invention relates to the testing of tubular connections by applying a pressure medium thereto. The pressure medium applied to the connection indicates whether or not there are any leaks in the connection, or if the joint is damaged so as to prevent proper seating and sealing of the joint surfaces.

2. Description of the Prior Art

In prior art methods of internal testing connections of tubular members for leaks, it has been customary to subject the connection only to high internal pressure at least as great as the pressure to which the connection will be subjected during use in an endeavor to test the leaks or to determine the integrity of the connection. One such device for internal testing is shown in U.S. Pat. No. 3,196,666. However, even though at least several internal test devices have been employed for a number of years, to apply a high internal test pressure to the fully made up connections, such prior art manner of testing actually energizes or increases the bearing and sealing pressure in most, if not all, connections and tends to hide or mask any leaks that may be present in the connections, rather than expose leaks or damage to the connection which might subsequently become troublesome in use. While external testing of connections between tubular members has been done, the connections have been subjected only to a high pressure approximating at least as great as the pressure to which the connection will be subjected during use for testing of leaks and connection integrity.

Nor have the connections between tubular members, so far as known to applicant, been tested in only partially made up relationship. On the contrary, so far as known to applicant, the prior art devices, internal or external, have always been used when the connection is in fully made up position — or what was understood to be fully made up position.

SUMMARY OF THE INVENTION

A primary object of the present invention is to aid in overcoming pollution problems resulting from leaks in flow lines, pipelines, oil and gas wells, as well as where tubular members are connected in any of various industrial applications.

A further object is to apply a low torque to the connection between tubular members to form an initial seal therebetween, and then test it in such condition in an endeavor to test the connection under more critical conditions.

The present invention is directed to a method of internally testing connections between tubular members by stage testing the connection at various stages of makeup of the connection and at various pressures to test the connection for leaks and damages.

Still another object of the present invention is to apply less than full makeup torque to a connection and apply a pressure fluid internally of the connection for testing thereof at the partial makeup condition of the connection.

Yet another object of the present invention is to provide a method of testing a connection between tubular members which tends to de-energize rather than energize the connection for determining leaks therein or damage thereto.

Still a further object of the present invention is to provide a method of internally testing a connection between tubular members by applying only a partial amount of the recommended full makeup torque to the connection, applying an internal test fluid pressure to the connection in an amount less than that at which movement of the connection and/or tubular members occur and determining any falloff in pressure as an indication of any leaks in the connection.

Still a further object of the present invention is to provide a method of internally testing a connection between tubular members by applying only a partial amount of the recommended full makeup torque to the connection, applying an internal test fluid pressure to the connection in an amount less than that at which movement of the connection and/or tubular members occur and determining any falloff in pressure as an indication of any leaks in the connection and testing such connection at such pressure either in tension or out of tension, or out of tension and then in tension.

Still a further object of the present invention is to provide a method of internally testing a connection between tubular members by applying only a partial amount of the recommended full makeup torque to the connection, applying an internal test fluid pressure to the connection in an amount less than that at which movement of the connection and/or tubular members occur and determining any falloff in pressure as an indication of any leaks in the connection, and thereafter increasing the internal pressure by sequential increments and determining any pressure falloff as an indication of leaks at any of the increased sequential increments.

Still another object of the present invention is to provide a method of internally testing a connection between tubular members by applying only a partial amount of the recommended full makeup torque to the connection, applying an internal test fluid pressure to the connection in an amount less than that at which movement of the connection and/or tubular members occur and determining any falloff in pressure as an indication of any leaks in the connection, and thereafter increasing the internal pressure by sequential increments and determining any pressure falloff as an indication of leaks at any of the increased sequential increments and testing the connection at the increased sequential increments either in tension, or out of tension, or out of tension and then in tension.

Yet a further object of the present invention is to internally test a connection in tubular members where the connection is only made up partially to its recommended full made up torque and internal pressure then applied at increased increments in amounts so as to not energize the connection and determine any falloff in pressure at any of the increments as an indication of leaks in such connection.

Another object of the present invention is to test a tubular connection by applying a fluid medium under pressure internally of the connection for determining the integrity of the connection.

A further object of the present invention is to provide a method of testing tubular connections between tubular members either partially or fully made up by applying internal pressure less than that to which the connection will be subjected during use and determining any falloff in pressure as an indication of leaks in the connection.

Another object of the present invention is to provide a method of testing tubular connections between tubular members either partially or fully made up by applying internal pressure less than that to which the connection will be subjected during use and determining any falloff in pressure as an indication of leaks in the connection and testing such connection at such pressure either in tension or out of tension, or out of tension and then in tension.

Yet a further object of the present invention is to provide a method of internal testing a connection between tubular members in a manner to tend to de-energize the connection rather than energize it to thereby apply a more critical test to determine the integrity of the connection.

Other objects and advantages of the present invention will become more readily apparent from a consideration of the following description and drawings.

BRIEF DESCRIPTION OF THE DRAWINGS

FIG. 1 is a schematic representation of a suitable form of an apparatus which may be employed for internal testing of a connection;

FIG. 2 illustrates in quarter sectional enlarged view one form of connection to which the present invention may be applied;

FIG. 3 illustrates a partial sectional view of still another form of connection which may be tested by the present invention;

FIG. 4 is an enlargement of the portion that is circled in FIG. 3 but showing the connection damaged and in only a partially made up relation or position;

FIG. 5 is an enlargement of the portion of FIG. 3 that is circled but illustrating that the primary or initial seal is not established;

FIG. 6 illustrates still another form of connection which may be internally tested by the present invention;

FIG. 7 is an enlarged view of the connection of FIG. 6 in only partially made up relationship;

FIG. 8 is illustrative of still another connection which may be tested by the present invention; and FIG. 9 is a partial showing of the connection of FIG. 8 when it is not in fully made up relationship but with the primary or initial internal seal established.

DESCRIPTION OF THE PREFERRED EMBODIMENT

One suitable form of device for accomplishing the testing method of the present invention is illustrated in U.S. Letters Pat. No. 3,196,666 issued on July 25, 1965 illustrated schematically in FIG. 1 as including a body 10 upon which is carried the inflatable elements 11 and 12 in suitably spaced relation so that when the body 10 is positioned in the tubular bodies or members 20 and 21, the inflatable packers, or seal off members 11 and 12 will be on opposite sides of the coupling 13. A suitable conduit (unnumbered) in body 10 supplies fluid from a suitable source to inflate elements 11 and 12 and thereby isolate coupling 13 and preferably only a portion of tubular bodies 20 and 21 on each side thereof to seal off the connection.

A second conduit 15 supplies fluid such as liquid or gas, preferably inert, to the void 16 between the elements 11 and 12. In the form of connection illustrated in FIG. 1, as well as in enlarged detail in FIG. 2, the tubular members 20, 21 are provided with suitable threaded surfaces as shown at 22 and 23, respectively, for engagement with the threads 25 on the interior of the coupling 13.

Any suitable arrangement may be provided for surrounding the connection to seal it off so that a suitable pressure medium, such as liquid, or gas, preferably inert, may be applied externally to test the connection.

There may be other devices and arrangements, other than the device of the above patent, available and known to those skilled in the art which may be employed for containing fluid internally of the connection and for applying internal pressure in accordance with the present invention for testing the integrity of connection between tubular members.

The invention will be described in detail with regard to threaded connections; however, it can be applied to any type connection where pressure internally thereof tends to energize or seal the connection.

Heretofore, testing of connections between tubular members has been accomplished by initially elevating the pressure internally of the connection to the range of approximately 5,000 to 15,000 p.s.i. However, this method of testing actually energizes the sealing relationship of the threads 22 and 23 with the threads 25 and tends to hide or mask any leak that might be present within the coupling.

However, if the internal pressure within the connection 18 shown in FIGS. 1 and 2 is initially started and maintained at a pressure less than that which would tend to force the threads 22, 23 of tubular members 20 and 21 into tighter engagement with the threads 25 of coupling 13, and a suitable gauge 19 connected with the fluid medium in any suitable manner well known in the art as shown in FIG. 1, such pressure will be below that which would normally tend to energize or move the relatively thin ends of the tubular members 20 and 21 and thus seal the tubular members 20 and 21 more tightly within coupling 13. By observing the gauge 19 or other suitable instrument to determine whether or not a pressure drop occurs in the fluid body contained in the void 16 adjacent the connection 18, the integrity of the connection may be tested. If the gauge does not drop off in reading, then this indicates that no leak is occurring between the threads 22, 23, and 25.

The internal pressure within the connection is increased incrementally and by stages by any suitable amounts, say, for example, the initial pressure may be somewhere between atmosphere and 500 p.s.i., preferably at about 500 p.s.i. The pressure may then be sequentially increased by increments up to the point at which the internal pressure would tend to energize the ends of tubular portions 20 and 21 and force them into a tighter seal with the coupling 13. At each increment and stage of increase in pressure, the pressure gauge is observed for a period of time, say, 30 seconds, to determine if the gauge drops - which would indicate a leak in the connection. Also, a visual observation may be made at each end 13c, 13d of the coupling 13 for any indication of leakage of fluid which would indicate a leak.

Some types of connections are provided with multiple seals in an endeavor to improve and maintain the integrity of the particular type of connection between tubular members. In FIG. 3, there is illustrated one form of which is commonly referred to as a "Hydril" type threaded connection. This connection includes a box 30 and a pin 31, each of which has two step threads represented at 33 and 34 which are adapted to simultaneously coengage.

The box 30 is provided with an internal taper 36 and the lower end of the pin is provided with an external taper 37 adapted to engage the internal taper 36 and form a primary seal, or initial seal. An intermediate seat between the two step threaded surfaces 33 and 34 is shown at 39 which is formed by the shoulder 39a and 39b on each the box 30 and pin 31, and an external shoulder seal between box 30 and pin 31 is represented generally at 40 formed by shoulder surfaces 46 and 47 on the end of the box 30 and on the pin 31 adjacent the end of the threads thereon.

In prior art practices, this connection has been tested by applying pressure internally, generally at least to the pressure at which the connection will be used, and when the connection is in the fully made up or shouldered position as illustrated in FIG. 3 of the drawings, and such tests actually mask or hide any defects that may be present in the primary seal or in any other part of the connection which would affect the intergrity thereof. The primary seal formed by the tapered surfaces 36 and 37 is self-energizing against internal pressure in that internal pressure tends to force the tapered position 37 of the pin 31 more tightly against the taper 36 on the surrounding box 30 to form a better seal. Thus, internal pressure applied within the connection above that pressure which tends to overcome the compressive loading of the pin caused by its engagement with the tapered surface 36 would cause tapers 36, 37 to move into tighter engagement and would actually fail to properly indicate whether or not the connection would maintain integrity under the conditions in which it might be employed.

For example only, where the connection is employed in tubular members in oil and gas wells, it is subjected to many varied conditions. It is generally known that connections should be capable of withstanding external fluid pressures approaching the collapse pressure rating of the pipe body. Tubing in an oil or gas well is usually set with a packer, and mud of a sufficient weight to balance, or more generally to exceed, the shut-in bottomhole pressure is left in the annulus behind this string. As bottom-hole formation pressures decline, the external pressure differential increases. The oil string is generally not subject to external pressures when initially set, but high external differentials do occur as bottom-hole pressures decline or when the fluid originally left in the annulus is replaced with a lighter fluid during workover operations.

The oil and tubing strings are initially subjected to tensile loads equivalent to the weight of the respective strings in the fluid in which they are set. Where the bottom sections of the strings are fixed, as casing when cemented and tubing when anchored, additional tensile loads will result if the pressure inside these strings is increased, or if the temperature decreases. Other loads, such as those imposed when reciprocating casing when cementing and pulling stuck packers with tubing, must be considered.

The connection should be designed to withstand high compressive loads without damage. In running both casing and tubing, obstructions are sometimes encountered, and most, if not all, of the weight of the string may be applied in an effort to get by the obstruction. A more general case of compressive loading of tubing strings is in setting packers.

Thus, it can be seen that connections in tubular members are subjected to varying internal and external pressures, temperatures, and load conditions. It is therefore desirable to test the connections to try to determine that they will maintain a leak proof condition under all circumstances.

Therefore, it is desirable to test the connection in the most critical manner possible in an endeavor to avoid pollution by leakage at the convention.

The present invention provides a critical test in that the connection of FIG. 3 is initially made up to the lowest torque necessary merely to obtain an initial seal between the tapered surface 37 on the pin 31 and the tapered surface 36 on the box 30. The amount of torque required to accomplish this will vary anywhere from 5 per cent up to 50 per cent of the recommended ful makeup torque for the connection, and 10 per cent to 20 per cent of full makeup torque is generally the preferred range. At any event, when the initial test of the primary seal is conducted after the connection has been surrounded to seal it off, the amount of torque to accomplish the initial or primary seal should be such that there preferably is not an engagement by the shoulders 39a, 39b forming intermediate seat 39 on the pin 31 and box 30, nor should there by engagement of the tapered surfaces 46 and 47 which form the external shoulder seal 40. In other words, there preferably should be a clearance between surfaces 46 and 47 of at least some amount, say, for example only, 0.001 inch to 0.002 inch; however, the clearance will vary depending upon the type connection, and the weight, grade, and size of the tubular bodies. These conditions are known to those skilled in the art.

In some circumstances, due to damage, the shoulders 46 and 47 may engage at one or more places, but to conduct the so-called "low-torque" test of the present invention (when the connection is only partially made up), the shoulders 46, 47 should not be in complete sealing engagement.

By way of example only, when the connection such as that illustrated in FIGS. 3 through 9 has been made up to form the primary seal, the initial internal pressure applied may be by way of example only, from 100 p.s.i. to 500 p.s.i. The pressure gauge 19 is checked to see if the pressure falls off. If it does not, the internal pressure is increased sequentially in any suitable increments, by way of example only, at 500 p.s.i. increments, the pressure may be increased in increments and sequentially up to at least the pressure to which the connection will be subjected. The test pressure may go higher, but generally for economic reasons, an internal test pressure of about 1,000 p.s.i. above the conditions to which the connection would be subjected in use both externally and internally may be satisfactory in most instances.

In the FIG. 3 form of connection, the pin is longer than the box so that the primary or initial seal between tapers 36 and 37 is formed before shoulder surfaces forming seat 39 and shoulder surfaces 46 and 47 engage.

With the primary or initial seal formed by applying a torque range above indicated and with no seal or seating of surfaces 39a, 39b, 46, and 47, internal pressure applied to the connection is conducted to act against the primary or initial seal formed by the tapered surfaces 36 and 37. The amount of pressure applied to the primary seal is less than that which would energize the seal, or cause the tubular members to move into tighter sealing engagement. It can be appreciated that if the initial seal fails to leak under such circumstances, then the most critical test has been applied to the connection since it is being tested under those conditions which would be most conducive to its leaking if it were going to leak. That is, the seal formed by tapers 36 and 37 is formed with a minimum torque, possibly even handtight, and if the internal pressure test of this invention does not indicate a leak under such conditions, this indicates that the primary seal has actually been established between the tubular members 30, 31.

Under some circumstances, it may be desirable to conduct the tests on the connection as above described when it is out of tension; under some circumstances, it may be desirable to conduct the tests on the connection as above described when it is only in tension; and in other circumstances, it may be desirable to conduct the tests on the connection as above described when it is out of tension and then placing it in tension.

It can be further appreciated that the foregoing test applied to the primary seal will indicate whether or not there is damage to the connection which would prevent proper seating of the surfaces 36 and 37 to form a seal.

For example, if the pin 31 is, by way of example only, anywhere from 0.008 inch to 0.012 inch to 0.014 inch longer than the box 30 so that when the initial seal is supposed to be formed by the surfaces 36 and 37, there is a clearance between the upper tapered end surface 46 of the box 30 and the tapered annular surface 47 on the pin 31.

It can therefore be appreciated that damage to either of these surfaces by a protrusion or obstruction such as represented at 48 in FIG. 4 being formed thereon which is at least greater than the standoff distance between such shoulders when the tapered surfaces 36 and 37 should be in initial sealing contact would actually prevent the surfaces 36 and 37 from properly engaging to form the initial or primary seal, as illustrated in FIG. 5. In some instances, the shoulder damage may be an amount not readily visible, although sufficient to interfere with proper shouldering and preloading of the tapers 36 and 37 to form the primary internal seal as shown in FIG. 5. The internal test procedure above outlined would uncover such defect.

Furthermore, it can be appreciated that such damage or imperfection such as represented at 48 in FIG. 4 could be such that the torque gauge would indicate that the initial seal had been properly engaged since the recommended partial torque makup would have been applied and indicated on the torque gauge used in making connection, and such torque would actually have been applied to the damaged portion 48.

After the primary seal has been tested in the form of connection in FIGS. 3-5, the connection may then be made up to its final relationship by applying whatever additional torque is necessary or required.

After the connection of FIGS. 3-5 has been made up to full torque, it can then be determined if the makeup torque has corrected any failure of the primary seal to form. To accomplish this test, the connection is partially disconnected by backing off from the made up relationship of the connection by applying reverse torque, say, for example, until the connection is about one-half turn from made up position. The amount of backing off should be such that the initial or primary seal should be effective if there is no defect, foreign matter, or imperfection in the connection.

The internal seal is then tested again by the application of internal pressure as described hereinabove. If the internal seal fails, then damage to the shoulders 46 or 47 or at the seat 39 on the tapers 36, 37, is indicated or foreign matter is present which prevents proper seating, and the torque applied to the recommended full makeup torque of the connection has merely been applied against the damaged surface or foreign matter without actually affecting a proper primary seal.

In FIG. 5, the taper 36 and the taper 37 on the end of the box 30 and the pin 31 are shown in enlarged detail in spaced relation due to damage represented at 48 in FIG. 4. When the primary seal has been properly established, 36 and 37 will be in sealing engagement and partially preloaded when 46 and 47 are in spaced relationship, that is, when the connection is only in partially made up condition as described herein. In the specific form of connection illustrated, the angle of the shoulders 37 and 36 is 14° and the angle on the shoulders or surfaces 46 and 47 shown in FIG. 4 in enlarged form is 30°. The angle on the surfaces 33a, 33b is 14°.

When fully made up, the 14° primary seal is the seal against internal pressure, while the 14° on surfaces 33a, 33b is a seal against external pressure applied thereto.

In FIG. 6, another form of connection well known to those skilled in the art is illustrated wherein a multiple seal arrangement is employed. In this connection, the box 50 is provided with internal threads 51, and the pin 52 is provided with external threads 53. An annular groove 54 is provided in the box in which is mounted an annular seal ring 55.

In the connection shown in FIG. 6, the pin 52 and box 50 are threaded together until the seal 55 engages with the unthreaded end 58 on the pin, as shown in FIG. 7, and at this point, there normally is approximately, by way of example only, about 0.058 inch clearance between the end 51a of the box 50 and shoulder 52a on the pin 52. This condition occurs on this connection when the tubular bodies are about one-half turn from fully made up position. If desired, a gauge can be employed between shoulders 51a and 52a as they are made up to determine this condition, and to be sure they are in spaced relation.

When the connection is partially made up as above described and the connection sealed off by elements such as 11 and 12, internal pressure is applied to the connection in sequential increments as previously described to determine the integrity of the internal seal formed between ring 55 and surface 58.

After the internal seal ring 55 has been tested, this connection may be fully made up by applying additional torque and again sequentially tested in increments as described herein to test the additional seal which should be formed in the connection when it is in final made up position.

This last mentioned test is similar to the test applied to the type of connection shown in FIG. 2 in that they are both in final made up position, preferably, when the internal sequential, incremental pressure tests are conducted.

If desired, the foregoing tests may be conducted as above described while the connection has substantially no tension thereon; or the tests as above described may be conducted while the connection is in tension; or the tests as above described may be conducted while the connection is out of tension and then placed in tension so as to try to provide the most critical test as to the integrity of the connection.

In FIG. 8, another form of Hydril joint is shown. The box 30 and pin 31 are similar to that shown in FIG. 3, except that the 14° taper is eliminated on surfaces 33a, 33b, and the taper 36 stops at shoulder 36a which extends inwardly to the bore in the tubular body 30.

The testing of this connection may be carried out in the same manner as described with regard to FIGS. 3–7. FIG. 9 illustrates the pin and box in position for the "low torque test" previously described.

FIG. 9 illustrates surfaces 46 and 47 in spaced relation, and with the initial, primary seal formed at surfaces 36, 37, Since there is no damage to 46 or 47 or surfaces 36, 37, or foreign matter in the connection and no damage to threads 33, 34 or to shoulders 39a, 39b, the primary seal is properly formed by engagement of the surfaces 36, 37 and partially preloaded when the connection is partially made up as described herein.

After the "Hydril" joints of FIGS. 3–5 and 8, 9 have been made up to full torque, following a leak indication on the primary seal formed by 36, 37, they may be backed off, as described, and subsequent low torque sequential internal testing in increments as disclosed herein will indicate if the member 30, or member 31, has a defect which prevents them from making up in a manner to prevent leakage.

It can be appreciated that on the low torque internal stage test of the form of connection shown in FIGS. 3 through 9, a pressure drop or decay on a gauge that is connected to communicate with the pressure applied to the connection indicates that the connection is leaking. If no leak is present, then the present invention also establishes that the intermediate seal and the upper shoulder are not damaged sufficiently to interfere with the primary seal. Under most circumstances, leakage of the connection can be usually noted or seen outside the tubular member.

From the foregoing, it can be seen that if there are no leaks indicated when a connection is partially made up to the predetermined amount of torque at which the primary seal should be established, the connection may then be finally made up the desired amount by applying additional torque to complete the connection. It may be used, or it may then be further tested by sealing it off and applying fluid pressure sequentially and in increments and noting whether or not there is any pressure decay indication at any pressure stage on suitable instruments. If the connection does not leak when tested in partially made up condition, and when made up in its final relationship, this indicates that the connection should not leak during use.

If the test on the multiple seal connection when partially made up indicates a leak in the connection, it may be disconnected and inspected, or it may be tested further, depending upon the type of connection. If further tests are to be conducted, the connection is made up in its final relationship by applying additional torque. After it has been made up to its final relationship, the connection is backed off from such final made up position by applying a reverse torque, but the connection is maintained in its partially made up condition at which a primary seal should be established therein.

The partially made up connection is again tested as described herein to determine if any undesirable condition in the connection which originally may have caused the leak has been corrected by making the connection up to its final position with the additional torque. If the connection does not leak after this test, the undesirable condition in the connection has been corrected. If, however, the connection still leaks when tested in the partially made up condition, then the situation causing the leak was not corrected by applying the additional torque, and it may not be used.

It should be further noted that the internal stage tests described herein on any of the connections when fully made up, or the tests on a connection when it is fully made up and then backed off from its final made up position, if desired, may be conducted with the connection out of tension; they may be conducted with the connection is in tension; or they may be conducted when the connection is out of tension and then placed in tension.

The present invention may be employed in connection with the testing of casing, tubing, drill pipe, flow lines, pipelines, or any other tubular type conduit.

The final internal test stage pressure employed to test the connection in final made up position may be any desired pressure below the yield of the tubular members; however, in most instances, it is tested to approximately 1,000 p.s.i. above the conditions or pressure to which the connection would be subjected in use.

The foregoing disclosure and description of the invention are illustrative and explanatory thereof, and various changes in the size, shape, and materials as well as in the details of the illustrated construction may be made without departing from the spirit of the invention.

What is claimed is:

1. A method of testing a threaded connection between tubular members comprising the steps of:
   a. making up the connection to effect a seal between the connection and tubular members;
   b. positioning seal means to seal off the tubular members internally on each side of the connection;
   c. internally pressurizing the connection between the seal means with fluid to a pressure which is less than the pressure to which the connection is subjected during use; and
   d. determining any pressure decay from such pressure.

2. The method of claim 1 including the additional steps of increasing the internal pressure at least one increment between the seal means and determining any pressure decay at any increment.

3. The invention of claim 1 wherein such test is conducted with substantially no tension in the connection and tubular bodies.

4. The invention of claim 1 wherein such test is conducted while a tension is applied to the connection.

5. A method of testing a threaded connection between tubular members wherein the connection has multiple seals including at least one inner seal and an external seal comprising the steps of:
a. making up the connection between the tubular members in the range of about 5 percent to about 50 percent of the recommended full make up torque for the connection to engage at least one inner seal without engaging the external seal of the connection;
b. positioning seal means to seal off the tubular members internally on each side of the connection;
c. internally pressurizing the connection between the seal means with fluid to a pressure which is less than the pressure to which the connection is subjected during use; and
d. determining any pressure decay from such pressure.

6. The method of claim 5 including the additional steps of increasing the internal pressure at least one increment between the seal means and determining any pressure decay at any increment.

7. The method of claim 6 including the additional steps of thereafter making up the connection between the tubular members to substantially recommended full makeup torque and testing the connection internally by internally pressurizing between the seal means in increments from a pressure which is less than the pressure to which the connection may be subjected during use up to at least the pressure to which the connection may be subjected during use, and determining any pressure decay at any increment.

8. A method of testing a threaded connection between tubular members wherein the connection has multiple seals including at least one inner seal and an external seal comprising the steps of:
a. making up the connection between the tubular members to engage at least one inner seal without engaging the external seal of the connection;
b. positioning seal means to seal off the tubular members internally on each side of the connection;
c. internally pressurizing the connection between the seal means with fluid to a pressure which is less than the pressure to which the connection is subjected during use; and
d. determining any pressure decay from such pressure.

9. The method of claim 8 including the additional steps of increasing the internal pressure at least one increment between the seal means and determining any pressure decay at any increment.

10. The method of claim 9 including the additional steps of thereafter making up the connection between the tubular members to substantially recommended full makeup torque and testing the connection internally by internally pressurizing between the seal means in increments from a pressure which is less than the pressure to which the connection may be subjected during use up to at least the pressure to which the connection may be subjected during use, and determining any pressure decay at any increment.

11. A method of testing a threaded connection between tubular members wherein the connection has multiple seals including at least one inner seal and an external seal comprising the steps of:
a. making up the connection between the tubular members until the tubular members are in spaced shoulder to shoulder relation by a predetermined amount to engage at least one inner seal without engaging the external seal of the connection;
b. positioning seal means to seal off the tubular members internally on each side of the connection;
c. internally pressurizing the connection between the seal means with fluid to a pressure which is less than the pressure to which the connection is subjected during use; and
d. determining any pressure decay from such pressure.

12. The method of claim 11 including the additional steps of increasing the internal pressure at least one increment between the seal means and determining any pressure decay at any increment.

13. The method of claim 12 including the additional steps of thereafter making up the connection between the tubular members to substantially recommended full makeup torque and testing the connection internally by internally pressurizing between the seal means in increments from a pressure which is less than the pressure to which the connection may be subjected during use up to at least the pressure to which the connection may be subjected during use, and determining any pressure decay at any increment.

* * * * *

UNITED STATES PATENT OFFICE
CERTIFICATE OF CORRECTION

Patent No. 3,795,138                    Dated March 5, 1974

Inventor(s) Malvern M. Hasha

It is certified that error appears in the above-identified patent and that said Letters Patent are hereby corrected as shown below:

Col. 6, line 20, change "convention" to -connection-

Col. 6, line 27, change "ful" to -full-

Signed and sealed this 6th day of August 1974.

(SEAL)
Attest:

McCOY M. GIBSON, JR.              C. MARSHALL DANN
Attesting Officer                 Commissioner of Patents